(12) United States Patent
Bonanno et al.

(10) Patent No.: US 8,914,593 B2
(45) Date of Patent: *Dec. 16, 2014

(54) COUNTER-BASED ENTRY INVALIDATION FOR METADATA PREVIOUS WRITE QUEUE

(71) Applicant: International Business Machines Corporation, Armonk, NY (US)

(72) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,437

(22) Filed: Dec. 10, 2013

(65) Prior Publication Data
US 2014/0101396 A1    Apr. 10, 2014

Related U.S. Application Data

(63) Continuation of application No. 13/493,644, filed on Jun. 11, 2012.

(51) Int. Cl.
*G06F 12/00* (2006.01)
*G06F 12/08* (2006.01)
*G06F 12/12* (2006.01)
*G06F 11/07* (2006.01)

(52) U.S. Cl.
CPC ........ *G06F 12/0891* (2013.01); *G06F 12/0802* (2013.01); *G06F 12/00* (2013.01); *G06F 11/076* (2013.01); *G06F 12/12* (2013.01)
USPC .......................................... 711/156; 711/159

(58) Field of Classification Search
CPC ... G06F 12/00; G06F 11/14; G06F 2212/466; G06F 12/0891; G06F 11/076; G06F 11/0793; G06F 11/1064; G06F 12/0802; G06F 12/12
USPC .................................................. 711/156, 159
See application file for complete search history.

(56) References Cited

U.S. PATENT DOCUMENTS 6,144,982 A    11/2000  Panwar
7,152,154 B2   12/2006  McDonald (Continued)

OTHER PUBLICATIONS

S. Hines et al., (2009) Guaranteeing Instruction Fetch Behavior with a Lookahead Instruction Fetch Engine (LIFE). LCTES'09—Proceedings of the 2009 ACM SIGPLAN/SIGBED Conference on Languages, Compilers, and Tools for Embedded Systems, 119-128.

(Continued)

*Primary Examiner* — Hashem Farrokh
(74) *Attorney, Agent, or Firm* — Cantor Colburn LLP; Margaret McNamara

(57) ABSTRACT

Embodiments of the invention relate to counter-based entry invalidation for a metadata previous write queue (PWQ). An aspect of the invention includes writing an address into an entry in the metadata PWQ, the address being associated with an instance of metadata received from a pipeline and setting a valid tag associated with the entry in the metadata PWQ to valid. Another aspect of the invention includes initializing a counter to zero and incrementing the counter based on receiving a count signal from the pipeline until the counter is equal to a threshold. Yet another aspect of the invention includes setting the valid tag to invalid based on the counter being equal to the threshold.

8 Claims, 11 Drawing Sheets

(56) References Cited

U.S. PATENT DOCUMENTS

| | | |
|---|---|---|
| 7,552,294 B1 | 6/2009 | Justiss |
| 2002/0056034 A1 | 5/2002 | Gearty et al. |
| 2008/0005146 A1 | 1/2008 | Kubo et al. |
| 2008/0114479 A1 | 5/2008 | Wu et al. |
| 2009/0241097 A1 | 9/2009 | Wang et al. |
| 2010/0199042 A1* | 8/2010 | Bates et al. .................. 711/114 |
| 2011/0004840 A1* | 1/2011 | Feinberg et al. .............. 715/772 |
| 2011/0107149 A1 | 5/2011 | Alexander, III et al. |
| 2011/0119528 A1 | 5/2011 | Karlsson et al. |
| 2011/0252069 A1 | 10/2011 | Brodie et al. |
| 2011/0307659 A1* | 12/2011 | Hans et al. ................... 711/114 |

OTHER PUBLICATIONS

U.S. Non-Final Office Action of U.S. Appl. No. 13/493,644, filed Jun. 11, 2012; Mailed Date: Mar. 21, 2014;; 17 pages.

* cited by examiner

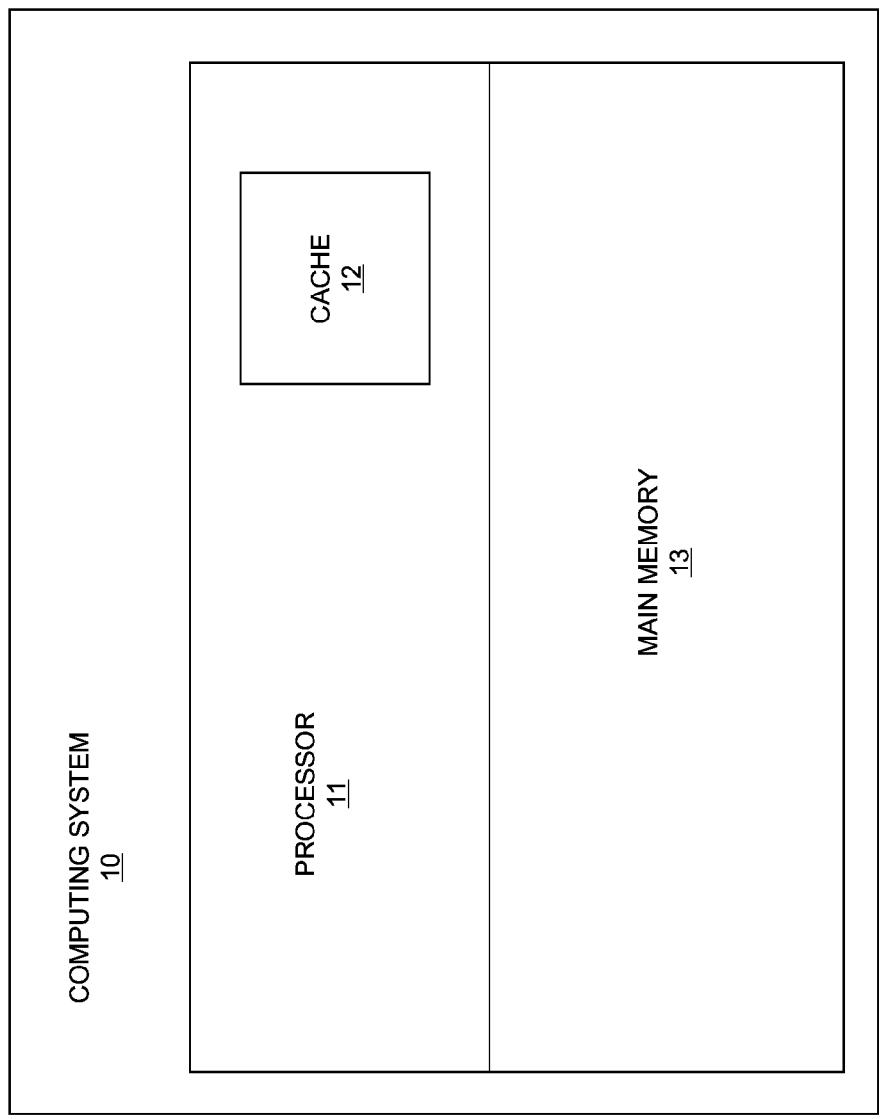

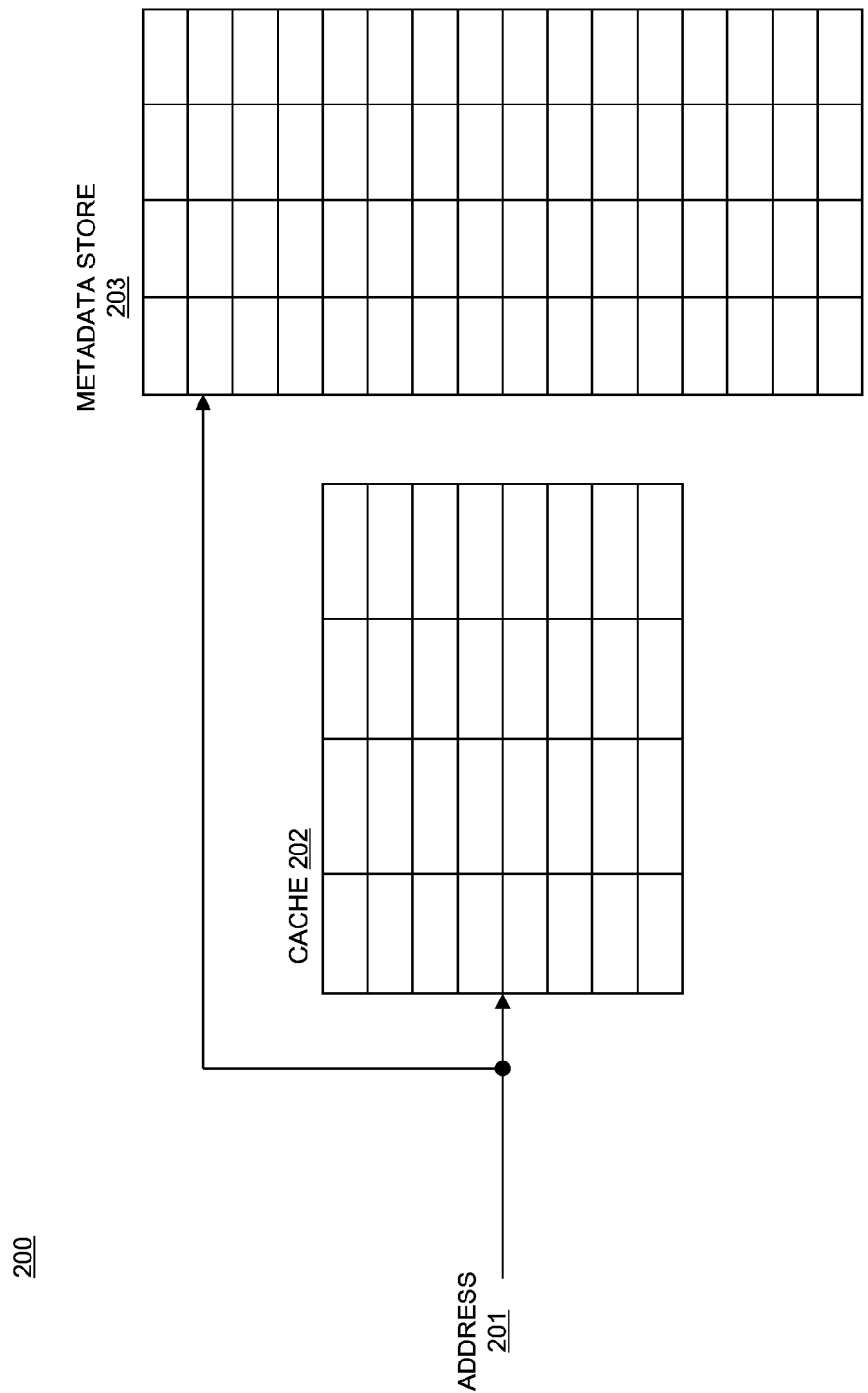

COUNTER-BASED ENTRY INVALIDATION FOR METADATA PREVIOUS WRITE QUEUE

CROSS-REFERENCE TO RELATED APPLICATION

This application is a continuation of U.S. application Ser. No. 13/493,644 (Bonanno et al.), filed on Jun. 11, 2012, which is herein incorporated by reference in its entirety.

BACKGROUND

The present invention relates generally to computer processing systems, and more specifically, to a metadata previous write queue associated with a metadata store in a processor.

A computer program that is executed by a processor in a computing system may be broken down into a series of operations. A pipeline architecture of the processor comprises a plurality of stages, and the operations proceed through the various stages of the pipeline during execution. In order to assist a processor pipeline in the execution of a computer program so that the execution may be relatively fast and efficient, metadata regarding various operations, such as instructions or data fetches, may be stored in a metadata store that is associated with the processor. The metadata may include, but is not limited to, data predicting the direction of a branch, data regarding the dependency between two instructions, or may relate to a data fetch, and may be indexed in the metadata store based on an address associated with the metadata. Subsequent executions of the same operation may produce identical instances of metadata. It is preferred to not write any particular instance of metadata into the metadata store more than once. While writing the same metadata into multiple sets in the metadata store may not be a data integrity concern, overall performance of the microprocessor may be reduced by the presence of duplicate entries in the metadata store, as other unique entries that would further assist in program performance may be displaced.

It may be relatively time-consuming and/or power consuming to search the metadata store to determine if a given metadata entry is already in the metadata store prior to writing the metadata entry into the metadata store. Therefore, in order to prevent duplicate metadata store entries, an operation may have a metadata marking, which indicates that a metadata entry already exists in the metadata store for the particular operation. Additionally, a previous write queue (PWQ) may be used to track the most recent entries that were written into in the metadata store. When a new entry is ready to be written into the metadata store, the new entry may be compared to the metadata PWQ, and, if there is a valid match for the address associated with the operation in the metadata PWQ, it is determined that the new entry is already in the metadata store and does not need to be written into the metadata store again.

SUMMARY

Embodiments include a system for counter-based entry invalidation for a metadata previous write queue (PWQ). An aspect of the invention includes writing an address into an entry in the metadata PWQ, the address being associated with an instance of metadata received from a pipeline and setting a valid tag associated with the entry in the metadata PWQ to valid. Another aspect of the invention includes initializing a counter to zero and incrementing the counter based on receiving a count signal from the pipeline until the counter is equal to a threshold. Yet another aspect of the invention includes setting the valid tag to invalid based on the counter being equal to the threshold.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1A depicts a computing system in accordance with an embodiment;

FIG. 2 depicts a cache and a multi-set associative metadata store in accordance with an embodiment;

DETAILED DESCRIPTION

Embodiments of counter-based entry invalidation for a metadata PWQ are provided, with exemplary embodiments being discussed below in detail. In some situations, it is possible that an entry that is found in the metadata PWQ may not actually exist in the metadata store. Such an entry in the metadata PWQ may incorrectly block new metadata entries from being written into the metadata store. Therefore, entries in the metadata PWQ may be invalidated based on one or more counters in order to avoid incorrect blocking of entry writes into the metadata store. One or more thresholds may be defined for the one or more counters to ensure that an entry in the metadata PWQ will be invalidated after any other instances of the operation associated with the entry that are in the pipeline at the time of the writing of the entry into the metadata store have completed execution. A threshold may be a predetermined value based on the depth of the pipeline in some embodiments. In other embodiments, a threshold may be based on a total number of operations that are in the pipeline at the time of an initial write of an entry into the metadata PWQ. In further embodiments, a threshold may be based on a number of instances of a particular operation that are in the pipeline at the time of the initial write of an entry for the particular operation into the metadata PWQ.

Each entry in the metadata PWQ may have an associated valid tag, and an entry may be invalidated by setting its associated valid tag to an appropriate value, e.g., false. Upon the initial write of an entry into the metadata PWQ, its associated valid bit is set active, e.g., true. When determining if a matching entry for an address exists in the metadata PWQ, the valid bit in the matching entry for the address is also checked, as in order to determine that a match for an address exists in the metadata PWQ, the valid bit in the matching entry for the address must be set to valid. Invalidated entries may be overwritten by new entries in the metadata PWQ. Such invalidation of entries in the metadata PWQ prevents incorrect blocking of new entries into the metadata store by the metadata PWQ.

Figure 1B:
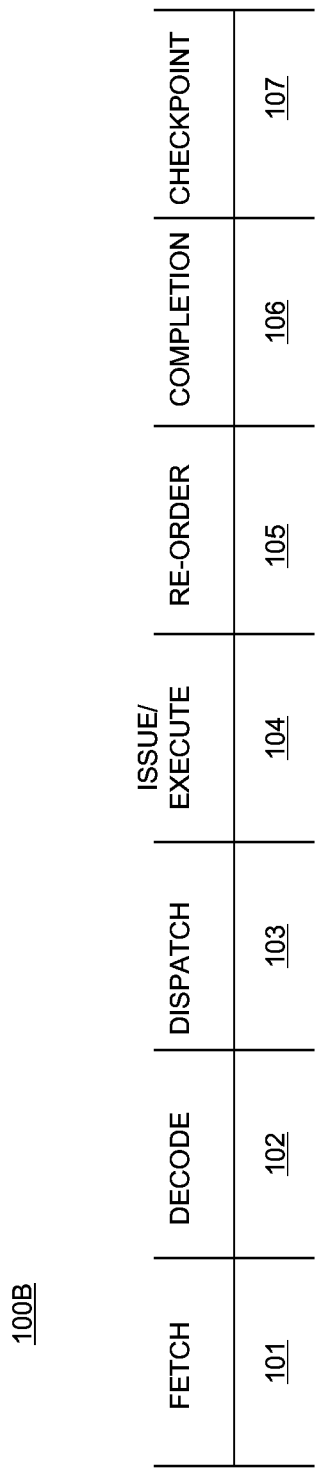
FIG. 1B depicts a processor pipeline in accordance with an embodiment.

FIG. 1A shows an illustrative embodiment of a computing system 10. The computing system 10 includes a processor 11, which has a cache 12. The cache 12 may comprise any appropriate type of cache, such as an instruction cache, a branch table, or a data cache. The computing system additionally includes a main memory 13. During execution of an operation, the processor 11 may check for the cache 12 for data regarding the operation. If the data regarding the operation is not present in cache 11, the processor 11 may retrieve the data regarding the operation from main memory 13. FIG. 1B shows an illustrative embodiment of a pipeline 100 having a plurality of stages 101-107, which may be incorporated into processor 11 of FIG. 1A. Operations proceed through the pipeline from fetch stage 101 through stages 102-106, and are completed at checkpoint stage 107. Metadata corresponding to operations in the pipeline 100 may be written into a metadata store that is associated with a metadata PWQ (discussed in further detail below) at checkpoint stage 107 in some embodiments. An operation may have any appropriate number of instances in the process of proceeding through pipeline 100 at once. FIG. 1 is shown for illustrative purposes only; a pipeline may have any appropriate number of stages in various embodiments.

Figure 3:
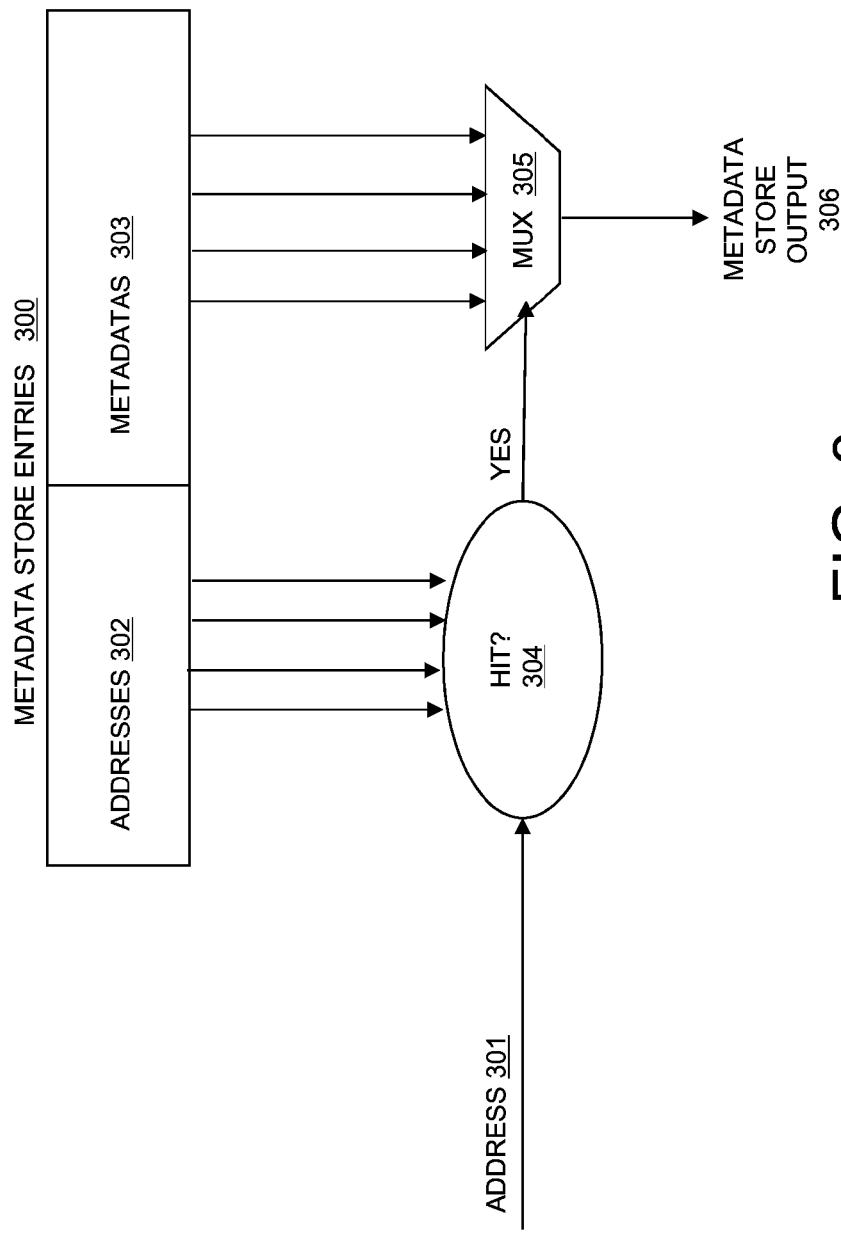
FIG. 3 depicts a congruence class of entries in a metadata store in accordance with an embodiment.

FIG. 2 shows an embodiment of a system 200 including a cache 202 and a multi-set associative metadata store 203 that may be associated with a pipeline, such as pipeline 100 that was shown in FIG. 1. Cache 202 may comprise cache 12 as is shown in FIG. 1A. The cache 202 may comprise any appropriate type of cache, such as an instruction cache, a branch table, or a data cache. The metadata in the metadata store 203 may be accessed in parallel with the cache 202 using an address 201, which is an address that is associated with an operation, for example, that is currently being processed in the pipeline. The metadata store 203 may comprise an array that associates each instance of metadata with an address, which may comprise, for example, an instruction address or data fetch address. An entry may be written into the metadata store 203 when metadata for an operation becomes known after processing of the operation. Different types of metadata may become available at different stages of the pipeline. For example, branch content may be known at branch resolution, which occurs in a specific part of the pipeline; however, content on store/load instruction dependencies may only be known at the end of the pipeline. FIG. 3 shows an embodiment of metadata store entries 300 in a metadata store congruence class, such as metadata store 203 of FIG. 2. Metadata store entries 300 include addresses 302, which are associated with metadatas 303. The input address 301, which may comprise an address associated with an operation currently being processed in an associated pipeline, is used by hit logic 304 to determine if there is a match for input address 301 in the addresses 302 of the metadata store entries 300. If hit logic 304 determines that there is a match, metadata 303 that is read out on metadata store output 306 via multiplexer 305 is used for processing of the operation associated with the address 301 in the pipeline.

Figure 4:
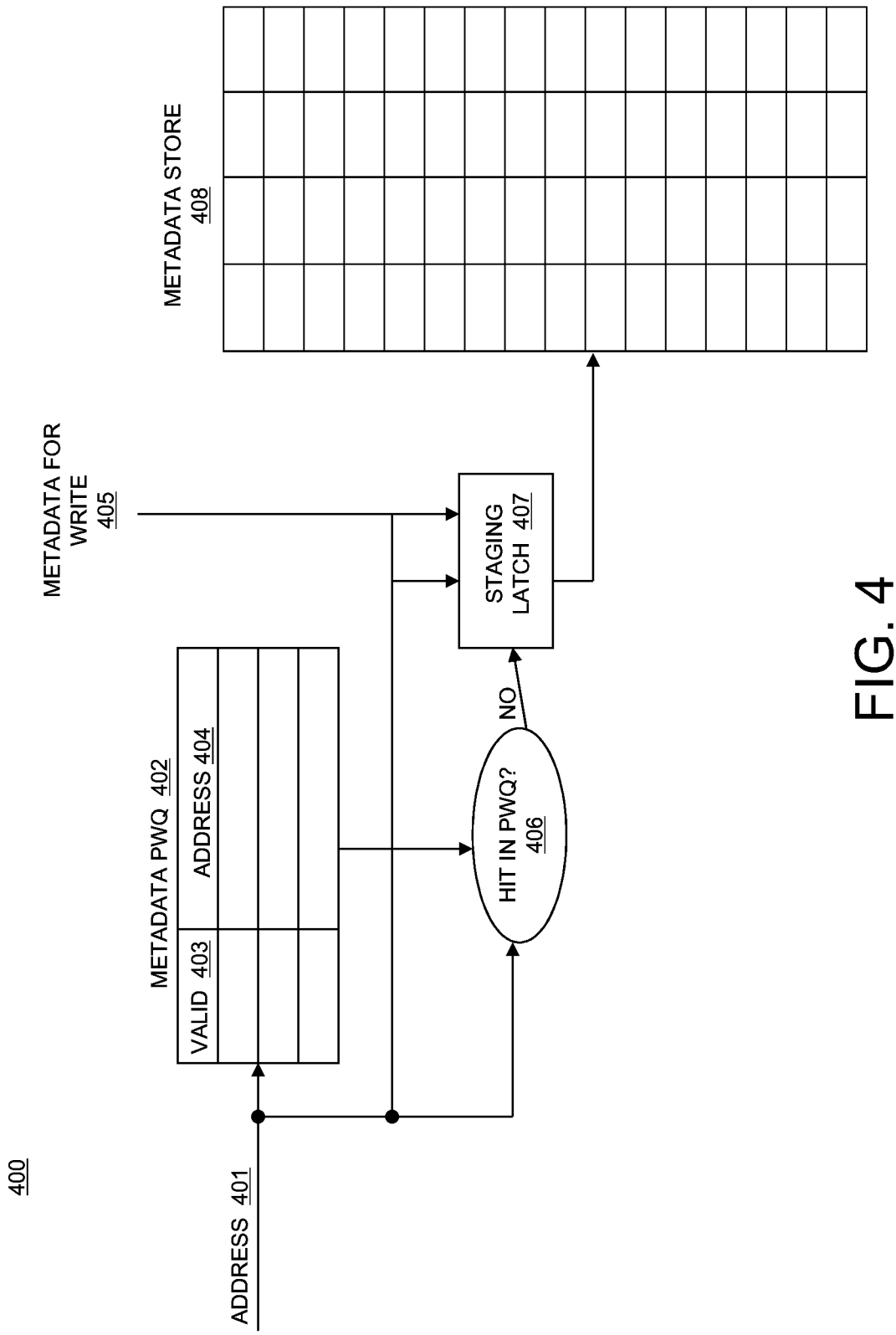
FIG. 4 depicts a metadata PWQ and a multi-set associative metadata store in accordance with an embodiment.

FIG. 4 shows an embodiment of a system 400 including a metadata PWQ 402 that is associated with a metadata store 408. System 400 may be incorporated into cache 12 as is shown in FIG. 1A. The metadata PWQ 402 as shown in FIG. 4 includes 4 entries; however, this is shown for illustrative purposes only. The number of entries in a metadata PWQ may depend on, for example, the size of the metadata store associated with the metadata PWQ, or the depth of the pipeline associated with the metadata store. Each entry in the metadata PWQ 402 has a valid tag 403 and an address field 404. Each entry's valid tag 403 is set to true or false (indicating whether the entry is valid or invalid) based on a counter, which is discussed in further detail below with respect to FIGS. 5-8. When an operation has metadata to write into the metadata store 408, the address 401 for the operation and the metadata 405 are both stored in staging latch 407. The hit logic 406 then determines if there is a match for the address 401 in an address field 404 in any of the entries in the metadata PWQ 402. If there is a match for address 401 in the metadata PWQ 402, it is then determined if the valid tag 403 associated with the matching address field 404 in the metadata PWQ is set to true, indicating a valid entry for the address in the metadata PWQ. If there is an entry in the metadata PWQ 402 comprising an address field 404 that matches address 401 that has its associated valid tag 403 set to true, hit logic 406 determines that there is a hit for the address 401 in the metadata PWQ 402, and the metadata 405 and the write address 401 are not written into the metadata store 408. However, if there is not a hit for the address 401 in the metadata PWQ 402, the hit logic 406 instructs the staging latch 407 to write the metadata 405 and the write address 401 into an entry in the metadata store 408, and additionally, a new entry is created in the metadata PWQ 402 for the address 401 (which is placed in the address field 404) with an associated valid tag 403 that is set to true. This new entry in the metadata PWQ 402 may overwrite an entry that has its valid tag 403 set to false. If no entry in the PWQ is invalid, a replacement scheme, such as a round robin or LRU replacement scheme, may be used to determine which entry acquires the new data in various embodiments.

Figure 5A:
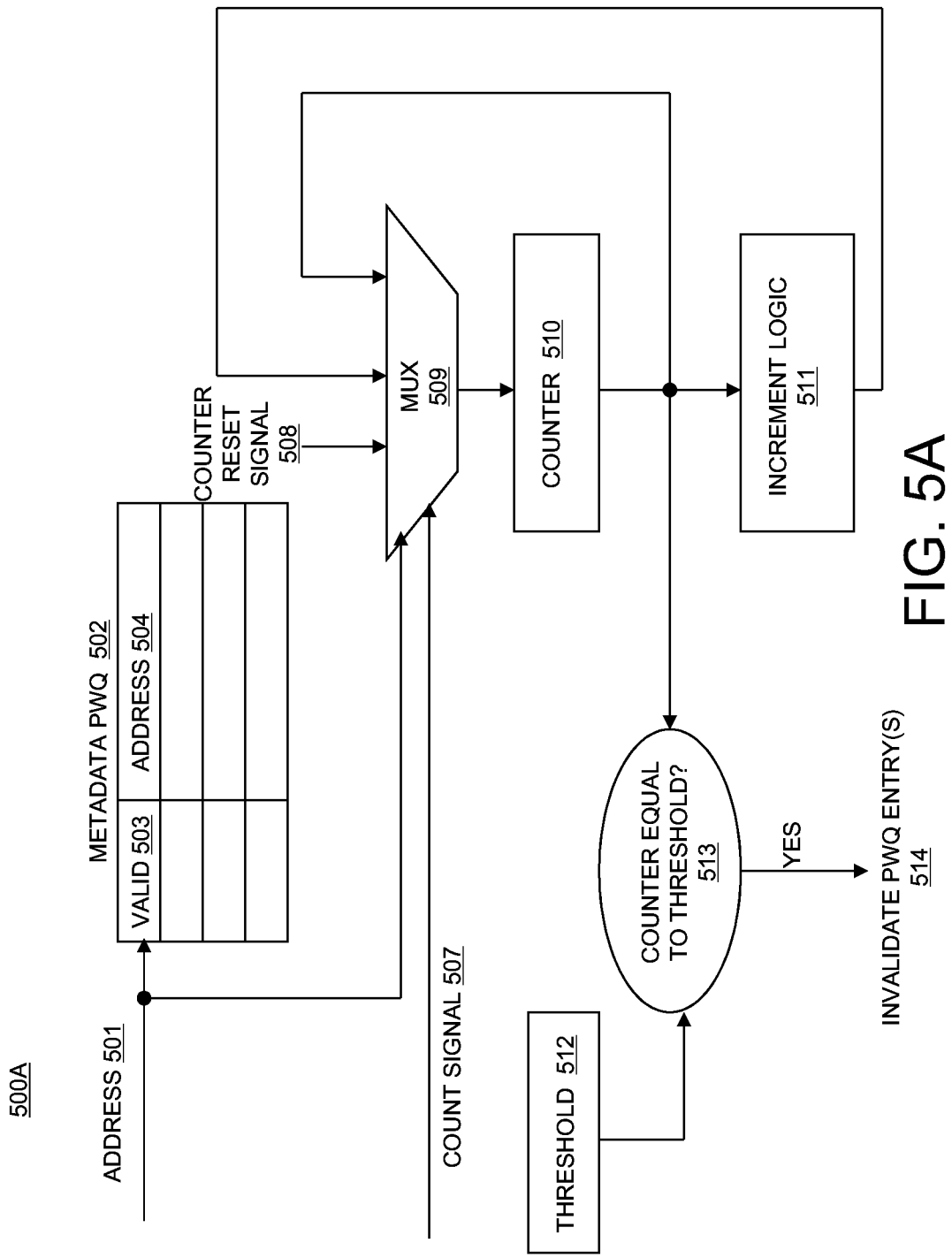
FIGS. 5A-5B depict systems for counter-based entry invalidation for a metadata PWQ in accordance with various embodiments.

FIG. 5A shows an embodiment of a system 500A for counter-based entry invalidation for a metadata PWQ. System 500A may be incorporated into cache 12 as is shown in FIG. 1A. System 500A includes a metadata PWQ 502 having a plurality of entries, each entry including a valid tag 503 and an address field 504. Write address 501 and count signal 507 are received from the pipeline, such as pipeline 100 shown in FIG. 1. Count signal 507 may indicate, for example, each operation that checkpoints processing in the pipeline. Counter reset signal 508, multiplexer 509, and increment logic 511 are used to maintain counter 510. The counter reset signal 508 may be triggered by writing of a new entry into the metadata PWQ 502. Threshold 512 defines an upper bound for counter 510, and invalidate logic 513 determines when counter 510 is equal to threshold 512. In various embodiments, the threshold 512 may be a constant that is hardwired into the system 500A, a constant that may be configurable by a user of the system 500A, or may be determined based on the current state of the pipeline associated with the system 500A; this is discussed in further detail below with respect to FIGS. 6-8.

Figure 5B:
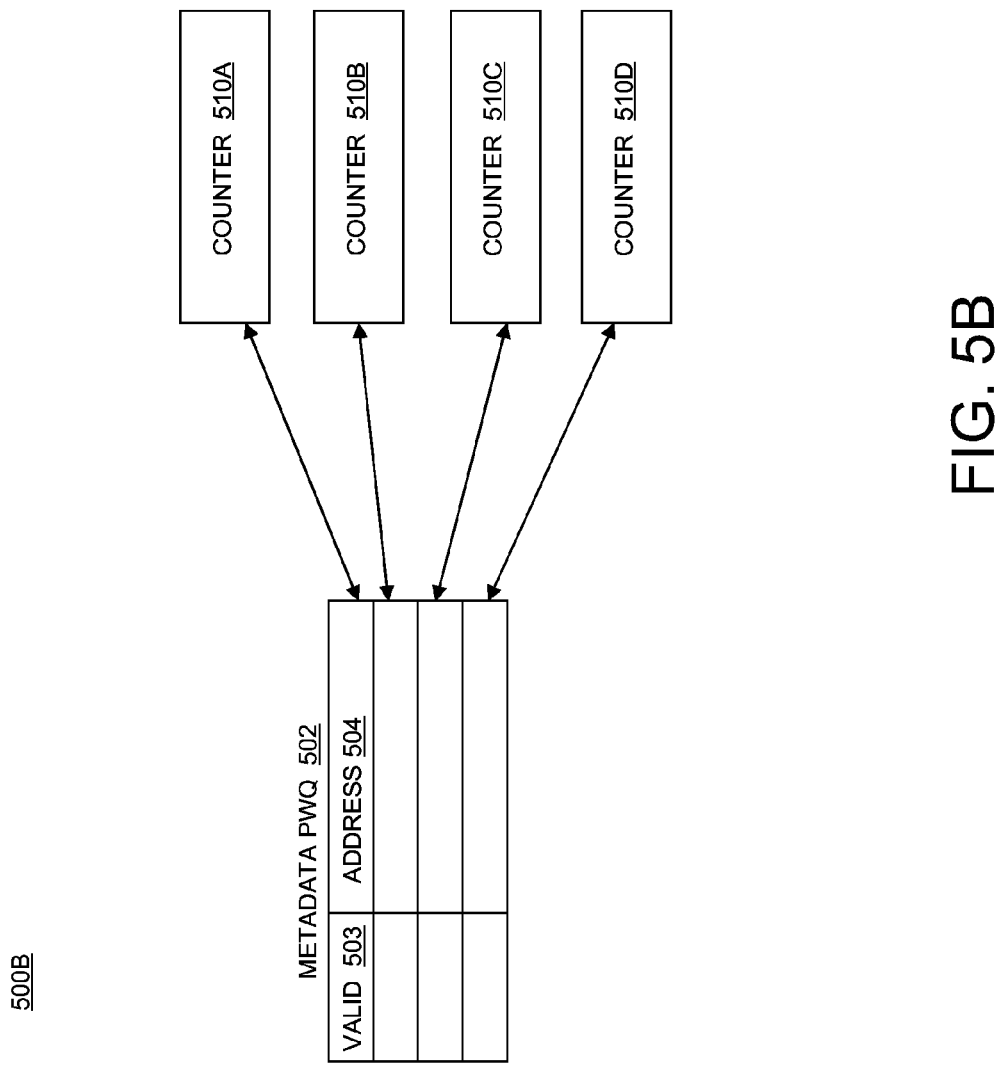
Figure 6:
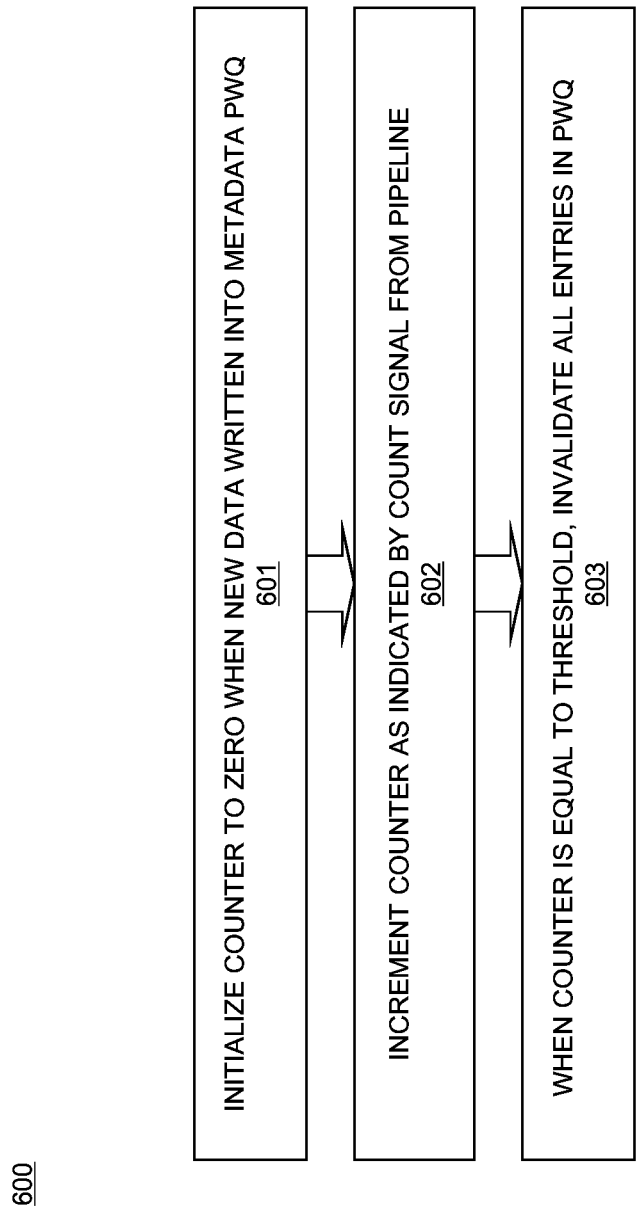
FIGS. 6-8 depict process flows for counter-based entry invalidation for a metadata PWQ in accordance with various embodiments.

In some embodiments, a system for counter-based entry invalidation for a metadata PWQ may comprise a single counter 510 and associated logic, as is shown in FIG. 5A and discussed in further detail with respect to FIG. 6. In other embodiments, a system for counter-based entry invalidation for a metadata PWQ may comprise plurality of counters and associated logic, wherein the number of counters is equal to the number of entries in the metadata PWQ 502 and each counter acts to invalidate its single associated entry in the metadata PWQ 502; this is discussed in further detail with respect to FIG. 5A-B and FIGS. 7-8. An embodiment of a system 500B for counter-based entry invalidation for a metadata PWQ including a plurality of counters 510A-D is shown in FIG. 5B. Each of counters 510A-D is associated with a single entry in the metadata PWQ 502. Each of counters 510A-D has respective associated increment and reset logic, i.e., counter reset signal 508, multiplexer 509, and increment logic 511, as are shown associated with counter 510 in FIG. 5A. In some embodiments, the values of each of counters 510A-D may be compared to a single threshold 512; in other embodiments, each of counters 510A-D may have a separate respective threshold 512. FIG. 5B is shown for illustrative purposes only; a system for counter-based entry invalidation for a metadata PWQ may comprise any appropriate number of entries in the metadata PWQ and associated counters.

FIG. 6 shows an embodiment of a method 600 for counter-based entry invalidation for a metadata PWQ. FIG. 6 is discussed with respect to FIG. 5A. Method 600 may be applied in system 500A with a single counter 510. In various embodiments of method 600 of FIG. 6, the threshold 512 may be a constant that is hardwired into the system 500A, or a constant that may be configurable by a user of the system 500A. First, in block 601, the counter 510 is set to zero by the counter reset signal 508. Counter reset signal 508 may be triggered to reset the counter 510 to zero when a new entry is written into the metadata PWQ 502; the new entry may have a valid tag 503 that is set to valid, i.e., true. Then, in block 602, the counter 510 is incremented by multiplexer 509 and increment logic 511 based on count signal 507. In some embodiments, the count signal 507 may be triggered each time an operation checkpoints and leaves the pipeline, and the counter 510 is therefore incremented by multiplexer 509 and increment logic 511 each time an operation checkpoints and leaves the pipeline. Next, in block 603, the invalidate logic 513 determines whether the value of counter 510 is equal to the threshold 512. If the value of counter 510 is equal to the threshold 512, the invalidate logic 513 triggers invalidate signal 514, which invalidates all of the entries in the metadata PWQ 502 by setting each entry's respective valid tag 503 to, for example, false. Method 600 may be repeated, starting at block 601, every time a new entry is written into the metadata PWQ 502. Incrementing of the counter 510 and invalidation of entries, as described with respect to blocks 602 and 603, may also be repeated as necessary.

Figure 7:
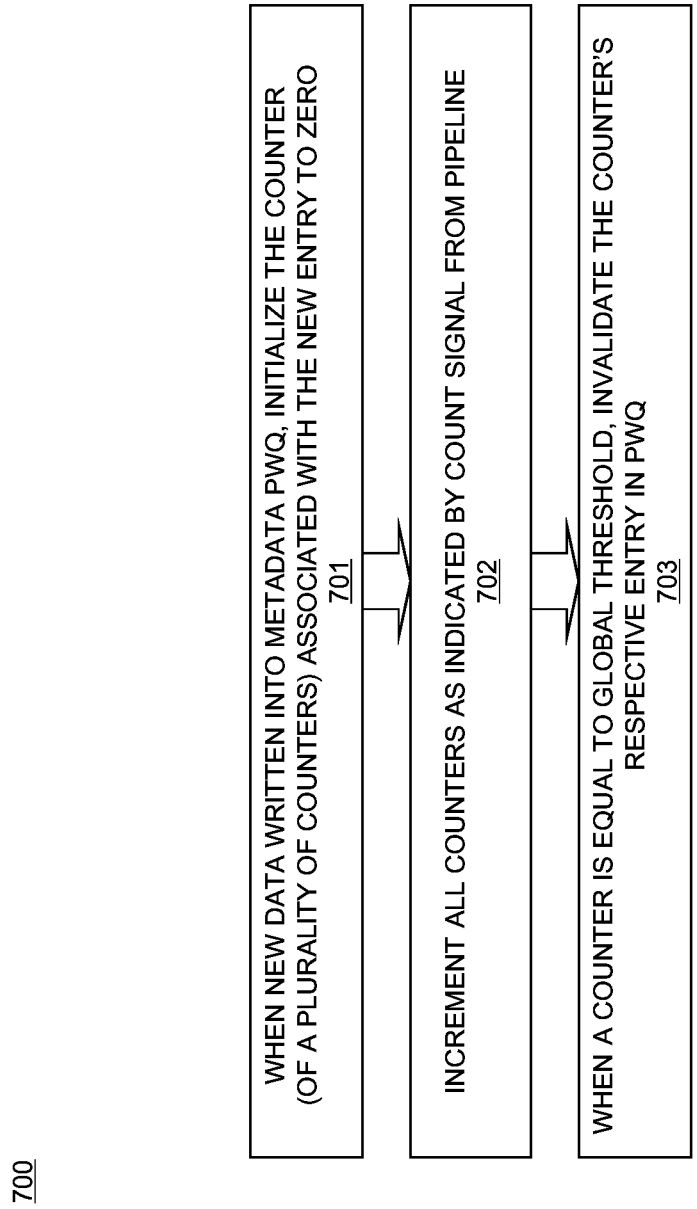

FIG. 7 shows another embodiment of a method 700 for counter-based entry invalidation for a metadata PWQ. FIG. 7 is discussed with respect to FIGS. 5A-B. Method 700 is applied in an embodiment of a system 500B such as was shown in FIG. 5B, including a plurality of counters 510A-D, each with associated reset and increment logic (i.e., counter reset signal 508, multiplexer 509, and increment logic 511). Each of the counters 510A-D is associated with a single respective entry in the metadata PWQ 502, and a single threshold 512 is applied to each of the plurality of counters 510A-D. In various embodiments of method 700 of FIG. 7, the threshold 512 may be a constant that is hardwired into the system 500A-B, or a constant that may be configurable by a user of the system 500A-B. First, in block 701, when a new entry is written into the metadata PWQ 502, the counter reset signal 508 for with the particular counter of counters 510A-D that is associated with the new entry is triggered, resetting the counter that is associated with the new entry to zero. The new entry may have its valid tag 503 set to valid, i.e., true. Then, in block 702, each of the plurality of counters 510A-D is incremented simultaneously based on the count signal 507. In some embodiments, the count signal 507 may be triggered each time an operation checkpoints and leaves the pipeline, and each counter 510A-D of the plurality of counters is therefore incremented by its respective multiplexer 509 and increment logic 511 each time an operation checkpoints and leaves the pipeline. Next, in block 703, the invalidate logic 513 determines whether the value of one or more of the plurality of counters 510A-D is equal to the threshold 512. If the value of any of the counters 510A-D is equal to the threshold 512, the invalidate logic 513 triggers invalidate signal 514, which invalidates any entries in the metadata PWQ 502 that are associated with the one or more of the counters 510A-D that were equal to the threshold 512. Invalidation may be performed by setting the one or more entry's respective valid tag 503 to false. Method 700 may be repeated whenever a new entry is written into the metadata PWQ 502. Incrementing of the counters 510A-D and invalidation of associated entries, as described with respect to blocks 702 and 703, may also be repeated as necessary.

Figure 8:
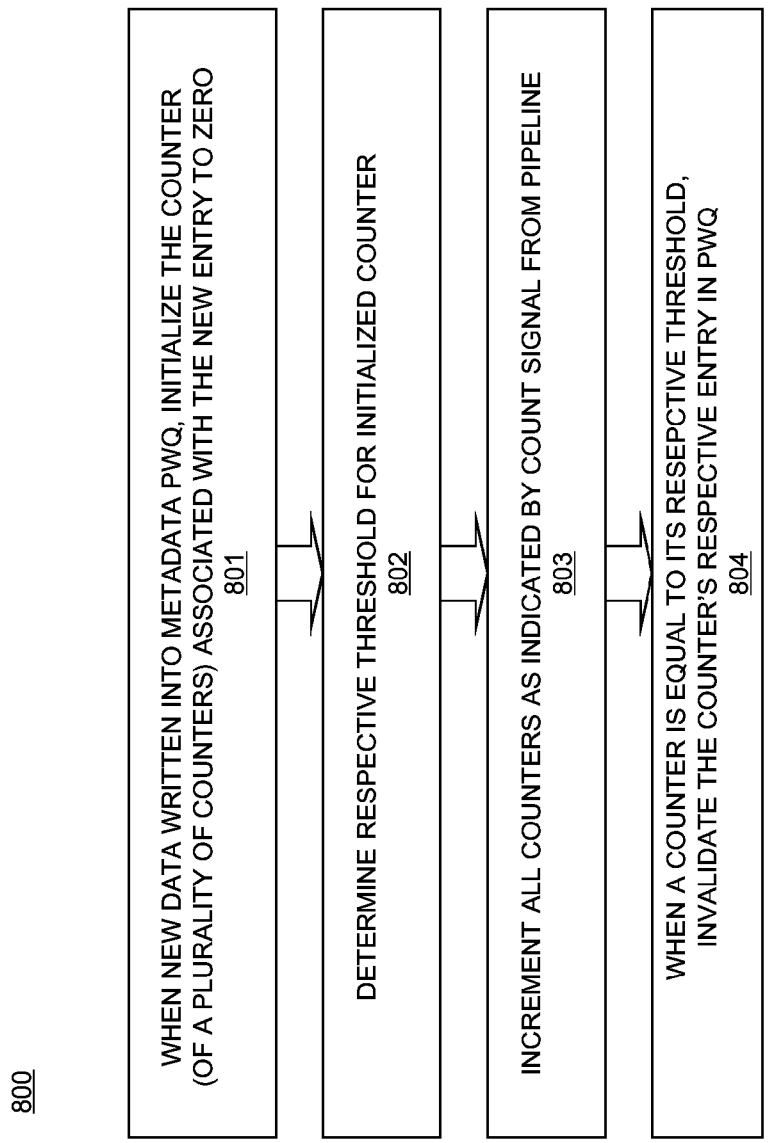

FIG. 8 shows another embodiment of a method 800 for counter-based entry invalidation for a metadata PWQ. FIG. 8 is discussed with respect to FIGS. 5A-5B. Method 800 is applied in an embodiment of a system 500B such as was shown in FIG. 5B, including a plurality of counters, such as counters 510A-D, each with associated reset and increment logic (i.e., counter reset signal 508, multiplexer 509, and increment logic 511). Each of the counters 510A-D is associated with a single respective entry in the metadata PWQ 502, and the plurality of counters 510A-D each have a separate respective threshold 512. The plurality of thresholds 512 are determined based on the current state of the pipeline, such as pipeline 100 of FIG. 1, that is associated with metadata PWQ 502. First, in block 801, when a new address corresponding to an operation is written into an entry in the metadata PWQ 502, the counter reset signal 508 for the particular counter of counters 510A-D that is associated with the new entry is triggered, resetting the counter associated with the new entry to zero. Next, in block 802, a new threshold 512 is determined for the counter that was reset in block 801. In some embodiments, the threshold may be based on a total number of operations that are in the pipeline at the time of the write of the entry into the metadata PWQ. In other embodiments, the threshold may be based on a number of instances of the particular operation that are in the pipeline at the time of the write of an entry for the particular operation into the metadata PWQ. Flow then proceeds to block 803, in which each of the counters 510A-D are incremented simultaneously by each counter's respective multiplexer 509 and increment logic 511 based on the count signal 507. In some embodiments, the count signal 507 may be triggered each time an operation checkpoints and leaves the pipeline, and each counter 510A-D of the plurality of counters is therefore incremented by its respective multiplexer 509 and increment logic 511 each time an operation checkpoints and leaves the pipeline. Then, in block 804, the invalidate logic 513 determines whether the value of any of the counters 510 of the plurality of counters is equal to the counter's respective threshold 512. If the value of any of the counters 510A-D is equal to the counter's respective threshold 512, the invalidate logic 513 triggers invalidate signal 514, which sets the valid tag 503 in any entries in the metadata PWQ 502 that are associated with the one or more counters 510 that were equal to their respective threshold 512 to false. Method 800 may be repeated whenever a new entry is written into the metadata PWQ 502, and incrementing of the counters 510A-D and invalidation of associated entries, as described with respect to blocks 803 and 804, may also be repeated as necessary.

Figure 9:
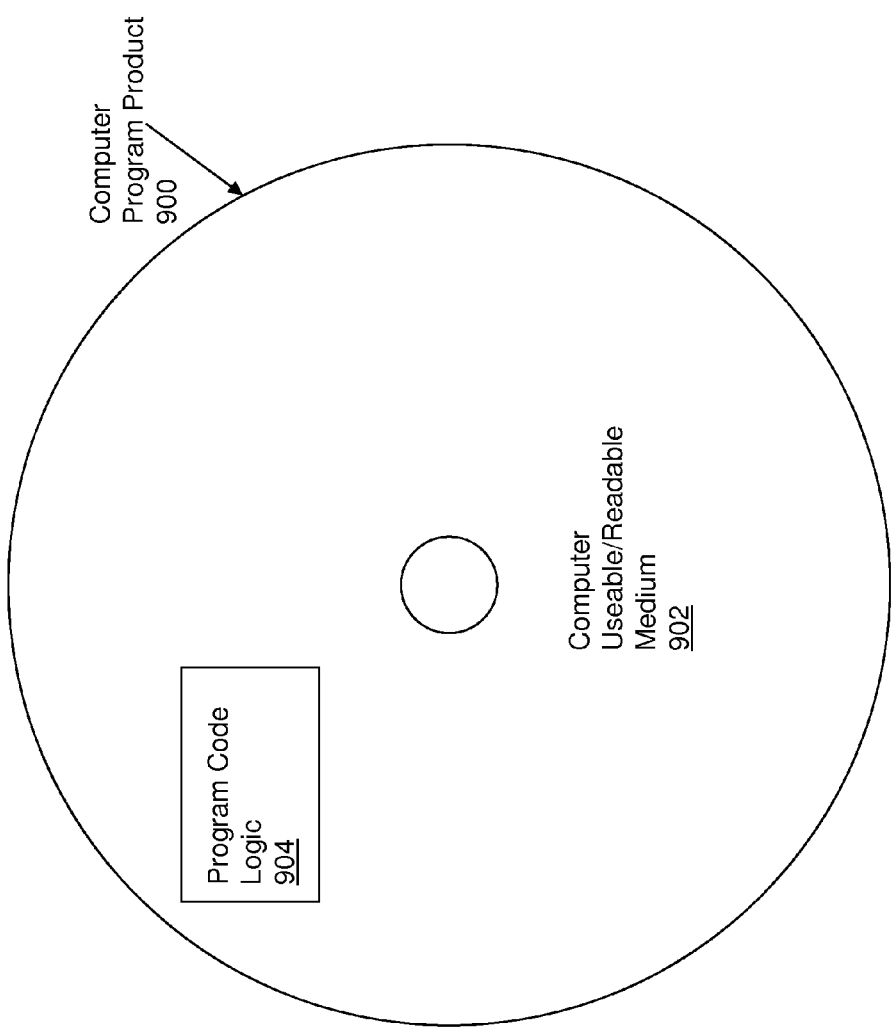
FIG. 9 illustrates a computer program product in accordance with an embodiment.

As described above, embodiments can be embodied in the form of computer-implemented processes and apparatuses for practicing those processes. An embodiment may include a computer program product 900 as depicted in FIG. 9 on a computer readable/usable medium 902 with computer program code logic 904 containing instructions embodied in tangible media as an article of manufacture. Exemplary articles of manufacture for computer readable/usable medium 902 may include floppy diskettes, CD-ROMs, hard drives, universal serial bus (USB) flash drives, or any other computer-readable storage medium, wherein, when the computer program code logic 904 is loaded into and executed by a computer, the computer becomes an apparatus for practicing the invention. Embodiments include computer program code logic 904, for example, whether stored in a storage medium, loaded into and/or executed by a computer, or transmitted over some transmission medium, such as over electrical wiring or cabling, through fiber optics, or via electromagnetic radiation, wherein, when the computer program code logic 904 is loaded into and executed by a computer, the computer becomes an apparatus for practicing the invention. When implemented on a general-purpose microprocessor, the computer program code logic 904 segments configure the microprocessor to create specific logic circuits.

Technical effects and benefits include prevention of incorrect blocking of writes into the metadata store by the metadata PWQ in a processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for counter-based entry invalidation for a metadata previous write queue (PWQ), the system comprising:
   a processor;
   a pipeline associated with the processor; and
   a metadata PWQ, the system configured to perform a method comprising:
     writing, by the processor, an address into an entry in the metadata PWQ, the address being associated with an instance of metadata received from a pipeline;
     setting a valid tag associated with the entry in the metadata PWQ to valid;
     initializing a counter to zero;
     incrementing the counter based on receiving a count signal from the pipeline until the counter is equal to a threshold; and
     setting the valid tag to invalid based on the counter being equal to the threshold.

2. The computer system of claim 1, wherein the metadata PWQ comprises a plurality of entries, each of the plurality of entries having an associated respective valid tag, and wherein setting the valid tag to invalid further comprises setting each of the plurality of valid tags associated with the plurality of entries to invalid.

3. The computer system of claim 1, wherein the metadata PWQ comprises a plurality of entries, and further comprising a plurality of counters, each of the plurality of counters being associated with a respective entry of the plurality of entries.

4. The computer system of claim 3, wherein initializing a counter to zero comprises initializing a respective counter of the plurality of counters associated with the entry to zero based on writing an address into the entry.

5. The computer system of claim 3, further comprising incrementing each of the plurality of counters simultaneously based on the count signal from the pipeline.

6. The computer system of claim 3, further comprising a plurality of thresholds, each threshold being associated with a respective counter of the plurality of counters, and wherein determining whether the counter is equal to the threshold comprises determining whether the counter is equal to counter's respective threshold.

7. The computer system of claim 6, wherein a value of a threshold is determined based on one of a number of operations associated with the address that are in the pipeline at the time of writing the address into the entry in the metadata PWQ, and a total number of operations in the pipeline at the time of writing the address into the entry in the metadata PWQ.

8. The computer system of claim 1, further comprising:
   receiving an address and an instance of metadata for writing into a metadata store associated with the metadata PWQ;
   determining whether a matching entry for the address exists in the metadata PWQ;
   determining whether a valid tag in the matching entry is set to valid based on determining that the matching entry for the address exists in the metadata PWQ; and
   avoiding writing the address and the instance of metadata into the metadata store based on determining that the valid tag in the matching entry is set to valid.

* * * * *